Nov. 24, 1970 TADAHIRO SEKIMOTO 3,542,956

PCM TELEPHONE COMMUNICATION SYSTEM

Filed May 31, 1967 3 Sheets-Sheet 1

INVENTOR
TADAHIRO SEKIMOTO

BY Sughrue, Rothwell, Mion, Zinn & Macpeak

ATTORNEYS

INVENTOR

TADAHIRO SEKIMOTO

BY Sughrue, Rothwell, Mion, Zinn & Macpeak

ATTORNEYS

Nov. 24, 1970 TADAHIRO SEKIMOTO 3,542,956

PCM TELEPHONE COMMUNICATION SYSTEM

Filed May 31, 1967 3 Sheets-Sheet 3

INVENTOR

TADAHIRO SEKIMOTO

BY Hughes, Rothwell, Mion, Zinn & Macpeak

ATTORNEYS

United States Patent Office 3,542,956
Patented Nov. 24, 1970

3,542,956
PCM TELEPHONE COMMUNICATION SYSTEM

Tadahiro Sekimoto, Washington, D.C., assignor to Communications Satellite Corporation, a corporation of Washington, D.C.

Filed May 31, 1967, Ser. No. 642,410
Int. Cl. H04j 3/06
U.S. Cl. 179—15 23 Claims

ABSTRACT OF THE DISCLOSURE

Telephone apparatus for transmitting pulse code information between a telephone set and a telephone station with the features of preventing pulse echo by blocking return paths during transmission of each pulse and preventing the blocking of incoming pulses by time multiplexing incoming and outgoing pulses. The transmitted information is transformed into a pulse code with pulses occurring at controlled clock times. The transmitted information is prevented from returning directly to the receiver by a gate which is opened at the clock times. In order to insure that the received pulses are not blocked by the gate a detector circuit connected to the output of the gate detects the absence of received pulses and actuates a switch which inserts a delay in the transmission path of the transmitted and received pulses thereby time separating the received and transmitted pulses. At the station, non-pulse code information received from a distant location is pulse coded and sent to the telephone set. The pulses in the code occur at times controlled by a clock generating circuit which generates clock pulses delayed with respect to the pulses received from the telephone set. As a result, the pulses sent to the telephone set by the coder at the station are anti-coincident with the pulses received at the telephone station from the telephone set. The station also includes a decoder to decode the pulse code from the telephone set and transmit the decoded information to some further location. Gating circuits which are opened during the clock pulse times prevent the coded output pulses from returning to the decoder and also prevent the coded output pulses from controlling the clock pulse generator. A repeater apparatus may be placed along the two wire transmission path connecting the telephone set and telephone station and also operates to prevent pulses in one path from returning along the opposite path and time separates the pulses coming from opposite directions.

Many communications systems use both four wire transmission lines and two wire transmission lines. The needs and uses of such lines are well known in the art and also the need for systems to transfer signals between the two wire and four wire lines is well known. The latter systems are known generally as hybrid circuits. In the context of the communications art and as used in this application, a two wire transmission line is descriptive of a line which is used to transfer information in two directions, i.e., transmission and reception directions. A four wire system includes a pair of single direction transmission lines; one transmits information and the other receives information. Other terminology often used to describe the transmission line systems is incoming highway, outgoing highway and incoming-outgoing highway. A two wire system is said to consist of a single incoming-outgoing highway, and a four wire system is said to consist of one outgoing highway and one incoming highway.

The need for hybrid circuits can be understood by considering the following simplified example of a communication path between two telephones wherein each telephone is connected to a local station by means of a two wire system and the stations are connected by a four wire system. As the speaker at the first telephone talks, his conversation is carried over the two wire system to the first station where the hybrid circuit transfers the conversation to the outgoing highway of the four wire system. The latter highway carries the conversation in the form of an electrical signal to the second station wherein a second hybrid circuit transfers the signal to the second two wire system.

For any non-ideal hybrid circuit, part of the signal on the incoming highway will "turn around" and go back on the outgoing highway causing an echo at the place where the information was initiated. In the ideal case there will be no echo because all of the signal from the incoming highway of the four wire system will be transferred to the two wire system.

Because of the speed of transmission, for distances up to transcontinental distances, the echo does not present serious problems. However, when information is to be relayed by satellites, the echo will occur at times sufficiently removed from the transmission time to cause a considerable problem.

The present invention is a system and apparatus which prevents echo in telephone communications by time multiplexing the incoming and outgoing information and by blocking the return paths during transmission of outgoing information.

The invention will be better understood by reference to the following detailed description thereof and the accompanying drawings which show a preferred embodiment of the invention.

For purposes of explanation only, the invention will be described in the context of a telephone system using a special form of PCM (pulse code modulation) known as delta modulation. It is also assumed, for purposes of explanation, that the bit rate of the encoders is 56 kilobits per second.

Figure 1:
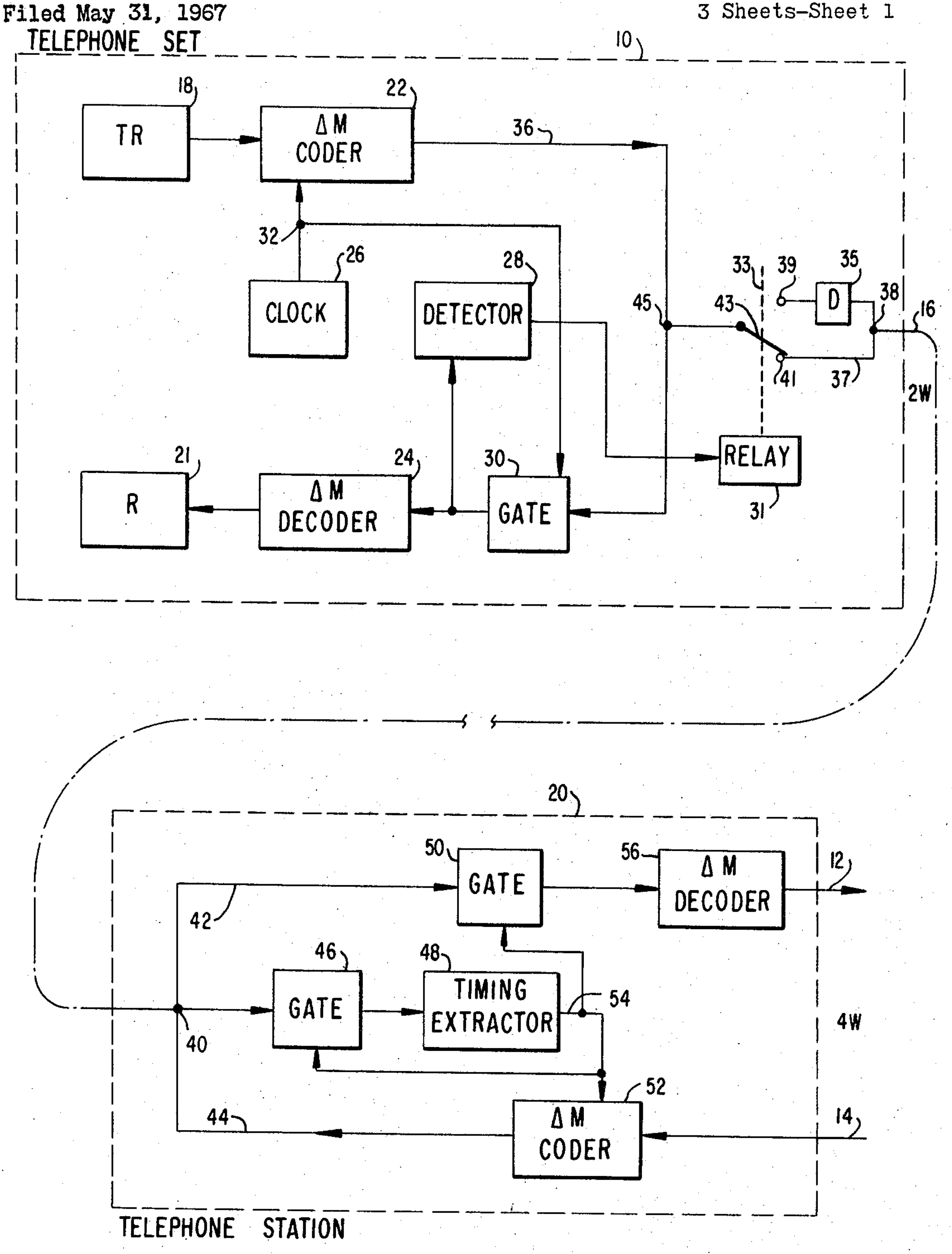
FIG. 1 is a block diagram of a telephone set and a telephone station connected by a two wire transmission line.

Referring to FIG. 1, there is shown a dashed block 10 which indicates a telephone set for transmitting and receiving telephone messages, a dashed block 20, which represents a telephone station, a two wire transmission line 16 connecting the telephone set 10 to the telephone station 20, and a four wire transmission line for connecting the telephone station to some further location. Although not shown, it will be apparent to those having ordinary skill in the art, that other means, such as a switch for connecting the telephone set to the telephone station when a call occurs, and a multiplexer for connecting plural telephone sets to the telephone station, may be included in an actual system somewhere between the telephone set 10 and the telephone station 20. However, since the aforementioned mechanisms are well known and also since they form no part of the present invention, they will not be further discussed.

Basically, the combination of a telephone set and a telephone station will send the voice information spoken into the transmitter 18 at the telephone set 10 over the two wire transmission line 16 to the telephone station 20 wherein the information is then transferred to the outgoing highway 12 of the four wire transmission line. Also, information from other locations received on incoming highway 14 of the four wire transmission line will be transferred at the telephone station to the two wire transmission line which carries the information to the telephone set 10. Thus, the two wire transmission line carries the information in two directions whereas each highway of the four wire transmission lines carries the information in only a single direction. The invention includes coders, decoders and other logic circuitry which operates to multiplex or time-separate the incoming signal, in the form of a pulse code, from the outgoing signal, in a form of a pulse code.

The telephone set 10 includes a transmitter 18 which is capable of receiving some information, such as voice communication, a coder 22 for converting the output of transmitter 18 into a pulse code, a decoder 24 for decoding received coded information, and a receiver 21 for receiving the output of decoder 20 converting it into usable information, such as sound waves. The telephone set 10 also includes clock circuit 26, detector 28, gate 30, relay 31, switch 43 and delay line 35.

The telephone station 20, includes a coder 52 and a decoder 56 which correspond respectively to the coder 22 and the decoder 24, a pair of gates 46 and 50, and a timing extractor 48, to be explained more fully hereinafter. The operation of the invention will now be explained in conjunction with FIGS. 2 and 3, which represent respectively pulse wave forms occurring in the telephone set and in the telephone station.

As is well known a delta modulation coder operates to provide a series of output pulses which represents the analog voltage input to the coder. The bit times of the output pulses are determined by the clock pulses applied by a lead 32 from clock circuit 26. In the specific example described herein, it is assumed that the clock pulses occur at a rate of 56 kilobits per second. The timing pulses or clock pulses from timing circuit 26 are indicated by wave form CT in FIG. 2, and the output wave form from the delta modulation coder 22 is indicated by the wave form TR of FIG. 2. It will be noted that the coded pulses in TR occur at substantially the same times as the clock pulses CT. For the clock pulse wave form CT, the period is $\tau$ and the frequency is $1/\tau$. The coded pulse wave form TR does not include a pulse for every clock pulse, but since the pulse times of coded pulse wave form are determined by the clock pulses, the coded pulse wave form has a base rate of $1/\tau$. The phantom or dotted line pulses are provided in the wave form diagram only for the purpose of indicating the positions of non-existing output pulses. The pulse wave form from the delta modulation coder 22 passes via switch 43 and line 37 to the output of the telephone set 10 wherein it is carried to the telephone station via the two wire transmission line 16. Switch 43 can be initially connected to terminal 39 or 41, but it will be assumed for purposes of explanation that switch 43 is initially connected to terminal 41. The transmitted pulse code is then received at the station 20 after a delay $T_d$ which is the transmission time between the set 10 and the station 20.

Figure 2:
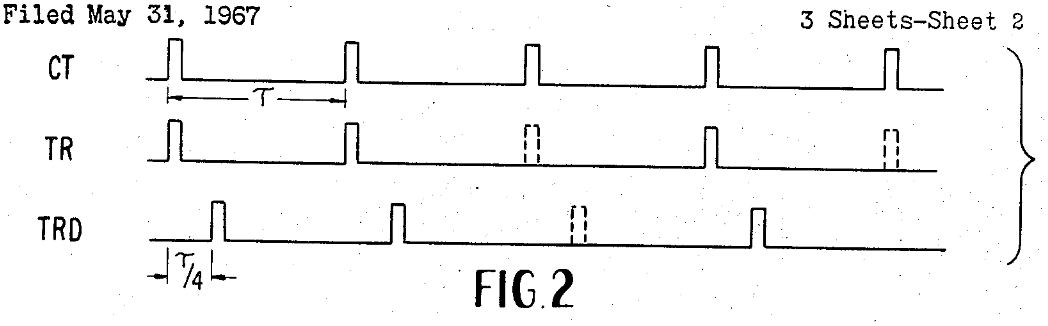
FIGS. 2 and 3 are wave form diagrams representing wave forms occurring at the telephone set and telephone station, respectively, of FIG. 1.

When the pulse code arrives at the telephone station 20, it is transferred via lead 42 through gate 50 to the delta modulation decoder 56 wherein the code is decoded and then transmitted over the outgoing highway 12 of the four wire transmission line. In order to prevent the pulse code wave form on lead 36 from passing through decoder 24 to receiver 20, a gate 30 is provided for the purpose of blocking the transmitted code. The output of the clock circuit, which is indicated by CT in FIG. 2 is used to block gate 30. Thus, each time a pulse occurs on lead 36, the gate 30 will be blocked by a timing pulse on lead 32 and therefore the transmitted pulses will not be passed to the decoder 24.

At the same time that information is being sent to some far off location by the apparatus described above, it is assumed that information is also being received from the far off location. The received information in the form of voice communication signals passes into the telephone station via incoming highway 14 of the four wire transmission line. The information is then coded by the delta modulation coder 52 at a 56 kilobit per second rate and at bit times determined by the clock signals on lead 54. The pulse code output from coder 52 is then transferred via lead 44 and the two wire transmission line 16, to the telephone set 10. At the telephone set 10, the pulses are passed through unblocked gate 30 to the decoder 24 wherein they are decoded an the output therefrom is sent to the receiver 20.

Figure 3:
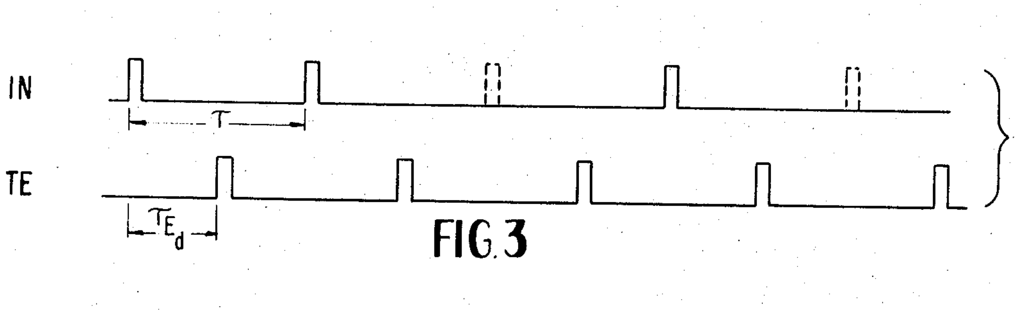

Referring to FIG. 3, the wave form labeled "IN" represents the pulse code received at point 40 from the telephone set 10. The latter pulses pass through gate 46 and into a timing extractor 48 which is operable to provide output pulses at the same base rate (56 kilobits per second) as the incoming pulses but delayed with respect to the incoming pulses. The pulse wave form appearing on lead 54 is indicated by the wave form TE shown in FIG. 3. It is noted that the pulses in wave form TE occur at a delay of $TE_d$ after the pulses in the wave form "IN." The exact time $TE_d$ is not critical; it is only necessary to insure that pulses in wave form TE do not coincide with pulses in wave form IN. The time $TE_d$ may be equal to $\tau/2$ where $\tau$ is the clock pulse period. Since the pulses TE block gates 46 and 50, and further since the phase of the pulses TE are controlled by the incoming pulses, the gates 46 and 50 will always pass the incoming pulses to the timing extractor 48 and the delta modulation decoder 56.

The output bit times from coder 52 are controlled by the pulses in wave form TE and therefore the output code pulses are blocked from passing through gates 50 and 46 due to the blocking of gates 50 and 46. Thus, there will be no echo of the information received on incoming highway 14.

The output code from the telephone station 20 is transmitted to the telephone set 10 with the pulses arriving after a delay $T_d$. Clearly, the information content of the code transmitted from station 20 to set 10 is not controlled by the information content of the code from set 10. However, the bit times of the code from station 20 are controlled by the bit times of the code from set 10. Thus, all pulse times can be referenced to the clock pulses CT from clock circuit 26.

Assuming that each clock pulse in CT occurs at a time $T_o$ which is defined herein as a reference which repeats each period, and the separation between clock pulses is $\tau$, it is apparent that $T_o+n\tau=T_o$ for any integer $n$. The pulses in the code from the set 10 arrive at the station 20 at bit times $T_o+T_d$. The timing extractor receives the latter pulses and provides clock pulses on lead 54 which occur at bit times $T_o+T_d+TE_d$. The clock pulses on lead 54 determine the bit times of the output code from coder 52 and thus the bit times for the output code pulses on lead 44 are also at times $T_o+T_d+TE_d$. The latter code pulses are transmitted to the set 10 and arrive at terminal 38 at bit times $T_o+T_d+TE_d+T_d$ which is equal to $T_o+2T_d+TE_d$.

Assuming that switch 43 is connected to terminal 41 there is no delay between terminal 38 and the input to gate 30 and therefore the received coded pulses arrive at the input to gate 30 at bit times $T_o+2T_d+TE_d$. As pointed out above, the gate 30 is blocked by the clock pulses CT for the purpose of preventing the transmitted code TR from passing through gate 30.

If $2T_d+TE_d=n\tau$, where $n$ is any integer, the received code pulses will also be blocked from passing through gate 30. It should be noted that the latter undesirable situation will only occur for the single case of the turn around delay (twice the transmission time plus the timing extractor delay) equaling an integral multiple of the pulse period.

In order to correct for the undesired blocking of wanted information, the set 10 operates to detect the blocking and inserts a further delay, D, between the terminal 45 of the set and the terminal 40 of the station. A detector 28 receives the pulses passing through gate 30 and provides an output trigger to relay 31 whenever the pulse input frequency drops below some predetermined minimum, thereby indicating undesired blocking. The relay controls mechanical linkage 33 which operates to connect switch 43 to terminal 39. With delay line 35 now in the circuit, the turn around time between the set and the station is $T_o+2T_d+TE_d+2D$.

Consequently, if $2T_d+TE_d=n\tau$ and since $T_o+n\tau=T_o$, the incoming code pulses occur at times $T_o+2D$ with respect to the blocking pulses at $T_o$. Although the exact delay time, D, is not critical to the invention provided that it separates the incoming code from the blocking pulses, one preferred time may be $\tau/4$.

The specific form of the detector 28 is not important to the invention. It is only necessary that the circuit operates to change the total transmission time whenever the input to the detector drops below a predetermined frequency. One example of apparatus for performing the desired function is indicate in FIG. 4. Many other forms of the detector circuit will occur to those having ordinary skill in the art to which the invention pertains.

Figure 4:
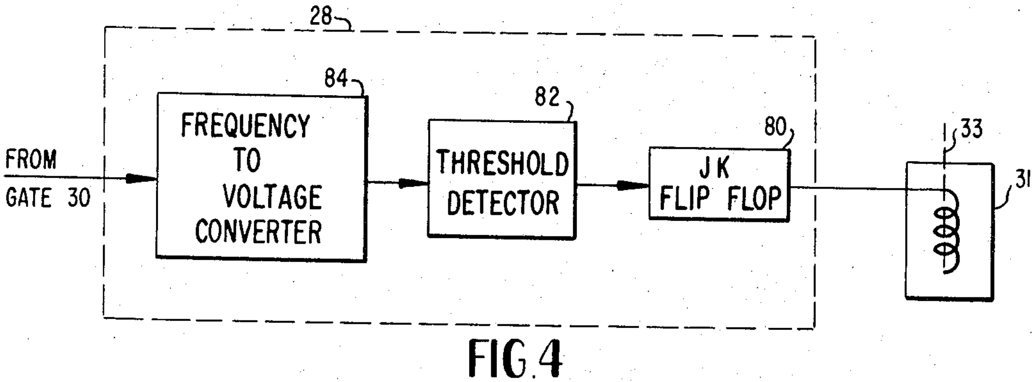
FIG. 4 is a block diagram of a detector which may be used as part of the telephone set of FIG. 1.

Referring to FIG. 4, the detector 28 includes a frequency-to-voltage converter 84, a threshold detector 82 and a JK flip flop 80. The circuits indicated by blocks are well known in the art and the details thereof will not be described herein. The output of the JK flip flop will always be in one of two possible states. The two states may be a positive and a negative voltage, a positive voltage and zero volts, or a negative voltage and zero volts. In one state the relay 31 causes switch 43 of FIG. 1 to be connected to terminal 41 and in the other state the relay 31 causes switch 43 to be connected to terminal 39.

The pulses passing through gate 30 are applied to converter 84 whose output is a voltage varying in accordance with the input pulse repetition frequency The threshold detector 82 is biased to provide an output trigger pulse to toggle flip flop 80 whenever the output voltage from converter 84 goes below some predetermined minimum. As an example, the circuits could be set to switch relay 31 whenever the input pulse repetition rate drops below $\frac{1}{2}\tau$ for a number of periods.

Referring again to FIG. 1, the specific circuitry used for the timing extractor 48 is unimportant to the invention so long as it provides the function of generating output pulses at a bit rate equal to the base bit rate of the incoming pulses and shifted by some predetermined amount with respect to the incoming pulses. Although many circuits for performing the latter function will occur to those having ordinary skill in the art to which the invention pertains, an example of one such circuit is shown in FIG. 5.

Figure 5:
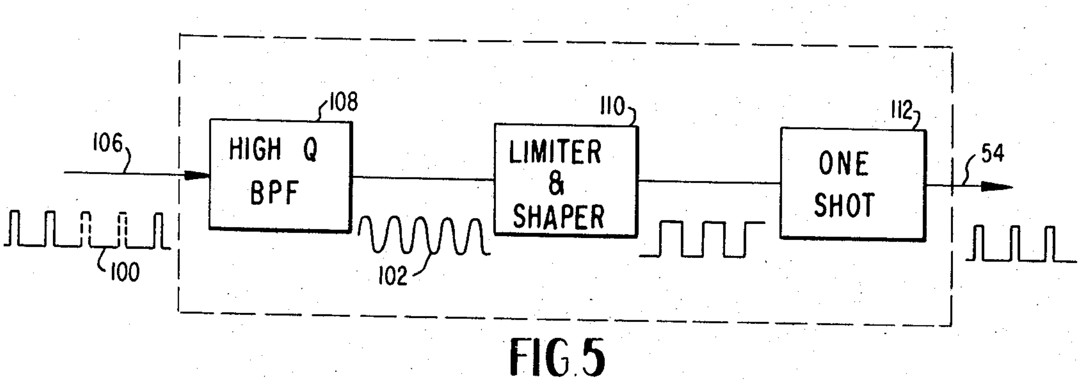
FIG. 5 is a block diagram of a timing extractor which may be used as part of the telephone station of FIG. 1.

Referring to FIG. 5, the timing extractor 48 is shown as comprising a high Q band pass filter 108, a limiter and shaper 110, and a one-shot multivibrator 112. The coded pulses on lead 106 are indicated by wave form 100. The high Q band pass filter 108 is tuned in the specific example described herein to the frequency of 56 kc. per second, and thereby provides an output wave form 102 which is substantially a sine wave at 56 kc. per second. The sine wave 102 is applied to a limiter and shaper 110 which squares the sine wave in a conventional manner. If it is desired to generate clock pulses having a 50% duty cycle factor, the output of the limiter and shaper may be applied to lead 54 through an inverter. On the other hand, if it is desired to provide pulses having a duty cycle factor other than 50%, the output wave form from the limiter and shaper 110, which will be a square wave, may be applied to a one-shot multivibrator 112 which is triggered by the negative going edge of the square wave form. The output pulses appearing on lead 54 is illustrated by the wave form TE in FIG. 3. Another variation would be to insert an inverter between the limiter and shaper 110 and the one-shot 112, and use a one-shot multivibrator which is triggered by the positive going edge of the square wave form. In any case, the result will be a series of pulses at the desired bit rate delayed with respect to the incoming pulses 100 by about one-half of the pulse repetition period.

Figure 6:
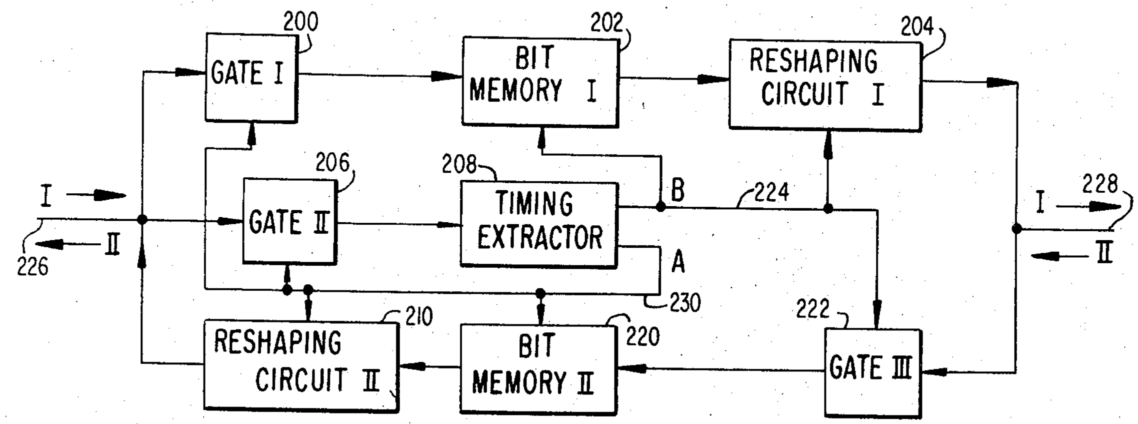
FIG. 6 is a block diagram of a preferred embodiment of a repeater which may occupy a position on the transmission path between the telephone set and telephone station of FIG. 1.

Another feature of the invention is a repeater which is capable of operating on the two wire transmission line 16 (FIG. 1) to provide the common function of reshaping the signals traveling along the two wire transmission line. The need for reshaping the signals when they are sent on long distances is well known in the art and therefore will not be discussed herein. The repeater must be capable of reshaping the signals which are traveling from the telephone set to the telephone station and also reshaping the signals traveling from the telephone station to the telephone set. The repeater of the present invention, aside from providing the latter functions, also operates to multiplex or time-separate the signals going in opposite directions. The repeater of the present invention is shown in FIG. 6 and will be explained with reference to the wave form diagrams of FIG. 7.

Figure 7:
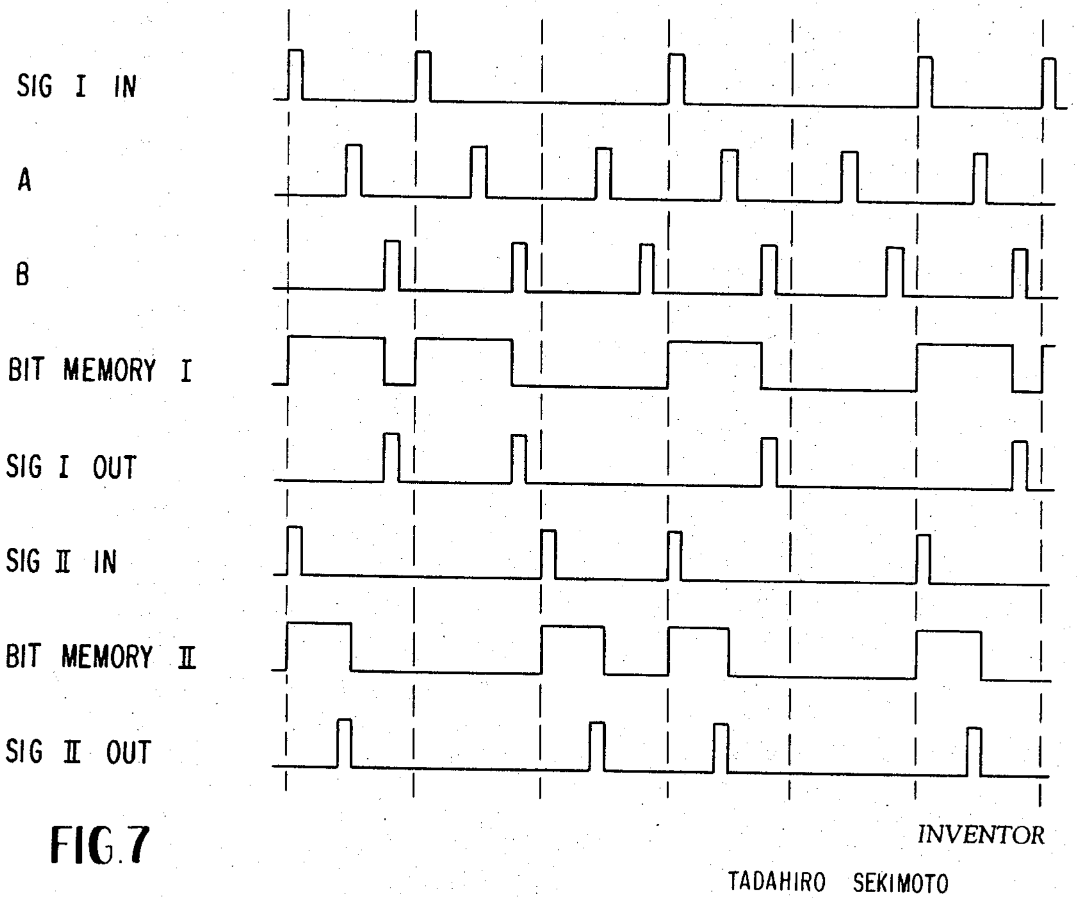
FIG. 7 is a wave form diagram of wave forms which occur in the repeater of FIG. 6.

Referring to FIG. 7, the wave form labeled Sig I IN represents the pulse code input applied at the left of the repeater on lead 226. The wave form labeled Sig II IN represents the pulse code received by the repeater on lead 228. The wave forms Sig I OUT and Sig II OUT represent respectively the times at which signals I and II appear at the outputs 228 and 226.

Signal I comes into the repeater on lead 226 and passes through gate 206 to the timing extractor 208 and also passes through gate 200 to the bit memory 202. The bit memory may be a bistable device which is set by an input pulse passing through gate 200 and reset by an input from the timing extractor 208. The bit memory 202 serves to store the pulses applied thereto for a period of time determined by the time difference between the input pulses and the B pulses from the timing extractor 208. It will be noted that the B pulses are indicated by wave form B in FIG. 7 and occur almost, but not quite, one period after the base times of the signal I input pulses. The timing extractor 208 also provides output pulses A, indicated by wave form A in FIG. 7, which occur at approximately one-half period after the base times of the signal I input pulses.

The incoming signal II on lead 228 is applied through gate 222 to a bit memory 220 which is identical to bit memory 220. The pulses applied to bit memory 220 are held therein until the bit memory receives a subsequent pulse from the timing extractor. Thus, no matter what the relative positions between the pulses of incoming signals I and incoming signals II, the pulses of the outgoing signals I and II will be determined by the time difference between pulses A and B, respectively. The operation of the repeater may be more understandable by discussing the specific case of pulse coincidence between incoming signals I and II. As can be seen in FIG. 7, the wave forms for Sig I IN and Sig II IN are such that the pulse times are coincident. The Sig I IN pulses are applied through gate 206 to the timing extractor 208 which provides output wave form A on lead 230 and output wave form B on lead 224. The pulses in wave form A block gates 200 and 206. Therefore, the pulses in Sig I IN will be able to pass unblocked through gates 200 and 206. The first pulse passed through gate 200 is stored in bit memory 202 and this is indicated by wave form "bit memory I" of FIG. 7. The effective pulse value will be held in bit memory 202 until a timing pulse B appears on lead 224. When the latter occurs, reshaping circuit 204, which may be any conventional reshaping circuit, samples and reshapes the contents of bit memory 202 providing an output pulse which is sent out on lead 228. At the same time, the pulse in wave form B operates to reset bit memory 202. In order to prevent the output pulse from the reshaping circuit 204 from echoing back through the lower half of the repeater, the pulses in wave form B are also used to block gate 222.

During the same time that the above operation is taking place, the pulses of incoming signal II pass through gate 222 and are stored in bit memory 220. The storage of the pulses in bit memory 220 is indicated by the wave form labeled "bit memory II" of FIG. 7. It can be seen from that wave form that the bit memory 220 stores each pulse from the time it is received until the next pulse in the A wave form occurs. For example, a given pulse on incoming signal II will pass through gate 222 and be stored in bit memory 220. When the next pulse in the A wave form occurs, the reshaping circuit 210, which may be any conventional reshaping circuit, samples and reshapes the contents of bit memory 220 and sends out a pulse on lead 226 which represents part of the signal II output. At the same time, the pulses in wave form A reset the bit memory 220 and block gates 200 and 206. Thus, although the signals I and II, from opposite directions, may arrive at the repeater in coincidence, they will leave the repeater reshaped and out of coincidence.

The timing extractor 208 used in the repeater must be slightly different than the timing extractor 48 (FIG. 1) used at the telephone station. The reason for this is that the timing extractor 208 must provide two series of pulses. The pulse wave form A, which results in pulses occurring at approximately one-half the pulse period following the input pulses, may be generated by a device similar to that shown in FIG. 5. The pulse in wave form B may be generated by simply applying the output of limiter and shaper 110 (FIG. 5) to another monostable multivibrator which provides output pulses having a width which is slightly less than the pulse period of interest. The output from the latter multivibrator would then be applied to an additional one-shot multivibrator which would be triggered by the lagging edge of the pulses applied thereto. The result would be a pulse wave form such as shown by wave form B in FIG. 7.

While the invention has been particularly shown and described with reference to a preferred embodiment thereof, it will be understood by those in the art that various changes in form and details may be made therein without departing from the spirit and scope of the invention.

What is claimed is:

1. A telephone communication system comprising;

(a) a telephone set, a telephone station for receiving information from said set and sending it to some further location and for receiving information from said further location and sending it to said set, and a transmission line for transferring information between said set and said station, (c) said station comprising, third means of transmitting information to said station in the form of a pulse code and second means for receiving pulse code information from said station, (c) said comprising, third means for transmitting information to said set in the form of a pulse code, and fourth means for receiving pulse code information from said set, and (d) means at said set and station for preventing the coincidence of transmitted and received pulses in said pulse codes at said set and also at said station.

2. A telephone communication system as claimed in claim 1 wherein said means for preventing comprises;

(a) at said set, a clock pulse generator, set gating circuit interposed between the transmission line and said second means, the input to said set gating circuit being electrically connected to the output of said first means, said set gating circuit being responsive to the output of said generator for blocking said gate in coincidence with the bit times of said set transmitted code, (b) at said station, timing extractor means responsive to the station received coded pulses for generating station clock pulses having a bit rate equal to the base bit rate of said station received coded pulses and delayed therefrom by a time other than an integral multiple of the pulse period, the output from said timing extractor means being applied to said station coder for controlling the bit rate and the bit times of the station transmitted code.

3. A telephone communication system as claimed in claim 2 further comprising;

(a) a first station gate at said station, connected between said fourth means and said transmission line, and (b) said means for preventing coincidence further comprising, a second station gate connected between said timing extractor and said transmission line, and means responsive to the output of said timing extractor for blocking said first and second station gates in coincidence with the bit times of said station transmitted code pulses, the input terminals of said station gating circuits being electrically connected to the output terminal of said third means.

4. A telephone communication system as claimed in claim 3 wherein said means for preventing further comprises;

(a) means responsive to the blocking of said set received code pulses by said gate for altering the transmission time of said coded information traveling between said set and said station.

5. A telephone communication system as claimed in claim 4 wherein said means for altering comprises;

(a) first and second lines having different transmission delay times, (b) detector means responsive to the pulses passing through said set gate for providing an output trigger whenever said last mentioned pulses drop below a predetermined pulse repetition frequency, (c) switching means for connecting one of said first and second lines between the input terminal of said set gate and said transmission line, and (d) means responsive to said output trigger for causing said switch means to connect the other of said first and second lines between said transmission line and the input terminal of said set gate.

6. A telephone communication system as claimed in claim 5 wherein said set gate and said station gates are inhibit gates, the output of said clock circuit being connected to the inhibit terminal of said set gate, and the output of said timing extractor being connected to the inhibit inputs of said station gates.

7. A telephone communication system as claimed in claim 6 wherein said coders and decoders are delta modulation coders and decoders, respectively.

8. A telephone communication system as claimed in claim 7 wherein the clock pulses from said timing extractor occur approximately one half period after the bit times of the pulses into said timing extractor, and the transmission delay times of said second line is approximately one fourth of the pulse period, greater than the transmission delay time of said first line.

9. A telephone communication system as claimed in claim 5 further comprising; a repeater interposed along said transmission line between said set and said station, said receiver being adapted to receive and reshape pulse code information traveling in either direction along said transmission line, said repeater having first and second terminals for receiving and transmitting pulse code information and comprising a first reshaping circuit for reshaping the pulses received at said first terminal, a second reshaping circuit for reshaping pulses received at said second terminal and means for controlling the time separation between pulses transmitted at said first and second terminals.

10. A telephone communication system as claimed in claim 9 wherein said means for controlling comprises;

(a) timing extractor means responsive to the pulses received at said first terminal for generating first and second repeater clock pulse wave forms having pulse frequencies equal to the base pulse rate of the incoming code at said first terminal and having bit times delayed with respect to the bit times of said received pulses by predetermined and different amounts,
(b) a first bit memory responsive to pulses received at said first terminal for storing each pulse therein,
(c) means responsive to each pulse in the second repeater clock pulse wave form for transferring the pulse stored in said first bit memory to the first reshaping circuit,
(d) a second bit memory responsive to pulses received at said second terminal for storing each pulse therein, and
(e) means responsive to each pulse in the first repeater clock pulse wave form for transferring the pulse stored in said second bit memory to the second reshaping circuit.

11. A telephone communications system as claimed in claim 10 wherein said means for controlling further comprises;

(a) first repeater gating means responsive to the pulses in first repeater clock pulse wave form for blocking passage of any pulses from said first terminal to said first bit memory during the duration of each of said first repeater clock pulses,
(b) second repeater gating means responsive to the pulses in said first repeater clock pulse wave form for blocking passage of any pulses from said terminal to said repeater timing extractor during the duration of each of said first repeater clock pulses, and
(c) third repeater gating means responsive to the pulses in said second repeater clock pulse wave form for blocking passage of any pulses from said second terminal to said second bit memory during the duration of each of said second repeater clock pulses.

12. A telephone communication system as claimed in claim 11 wherein;

(a) said first repeater gating means is an inhibit gate having its input terminal connected to said first terminal, its output terminal connected to said first bit memory and its inhibit terminal connected to the output of said timing extractor on which said first repeater clock pulses occur,
(b) said second repeater gating means is an inhibit gate having its input terminal connected to said first terminal, its output terminal connected to said timing extractor input, and its inhibit terminal connected to the output of said timing extractor on which said first repeater clock pulses occur, and
(c) said third repeater gating means is an inhibit gate having its input terminal connected to said second terminal, its output terminal connected to said second bit memory and its inhibit terminal connected to the output of said timing extractor on which said second repeater clock pulses occur.

13. A transmitter and receiver apparatus for transmitting and receiving pulse coded information to and from a two way transmission line comprising;

(a) encoding means responsive to input information for providing an output in the form of a pulse code modulation code,
(b) decoding means responsive to pulse code modulation codes for converting said codes into information in the form of said input information,
(c) blocking means for preventing the pulses from said encoding means from being applied to said decoding means, and
(d) adjusting means for insuring that the pulses comprising received pulse coded information are interleaved with the pulses from said encoding means.

14. The transmitter and receiver apparatus as claimed in claim 13 wherein;

(a) said encoding means comprises a clock generator for generating output clock pulses at a predetermined rate and a delta modulation encoder connected to and controlled by the said clock generator, and
(b) said decoding means comprises a delta modulation decoder.

15. The transmitter and receiver apparatus as claimed in claim 14 wherein said blocking means comprises a normally closed gate having its input connected to the output of said encoder and its output connected to the input of said decoder and means responsive to said clock pulses for opening said normally closed gate.

16. The transmitter and receiver apparatus as claimed in claim 13 wherein said adjusting means comprises;

(a) an electrical path between a terminal for connection to said two way transmission line and said encoder output and said decoder input,
(b) detecting means responsive to the blocking of received coded pulses for inserting a transmission delay in said electrical path.

17. The transmitter and receiver apparatus as claimed in claim 15 wherein said adjusting means comprises;

(a) detector means responsive to input pulses for providing an output trigger pulse when the input pulse rate drops below a predetermined pulse rate, the input of said detector being connected to the output of said normally closed gate, and
(b) means responsive to said trigger for inserting a transmission delay between the point of connection of said encoder and said gate and a terminal for connection to said two way transmission line.

18. A hybrid circuit adapted to receive and transmit pulse coded information along a two wire transmission line, comprising;

(a) first, second and third terminals for connection to a two wire transmission line, the outgoing highway of a four wire transmission line and the incoming highway of a four wire transmission line, respectively,
(b) pulse encoding means connected between said third and first terminals for converting information received at said third terminal into a pulse code to be sent to said first terminal,
(c) pulse decoding means connected between said first terminal and said second terminal for converting coded pulses received at said first terminal into information to be sent to said second terminal,
(d) first blocking means for preventing pulses from said encoding means from being applied to the input of said decoding means, and
(e) pulse control means for insuring that the pulses out of said encoding means are not coincident with the pulses received at said first terminal.

19. A hybrid circuit as claimed in claim 18 wherein said pulse control means comprises:

(a) a timing extractor means for providing clock pulses at its output having a predetermined frequency and delayed with respect to pulses applied to the input of said timing extractor, the output of said timing extractor being connected to the controlling input of said encoding means,
(b) a normally closed gate connected between said first terminal and said timing extractor input, and
(c) means responsive to the output of said timing extractor for opening said normally closed gate during the occurrence of a pulse at the output of said encoder.

20. A hybrid circuit as claimed in claim 19 wherein said blocking means comprises a normally closed gate having its input connected to said first terminal and its output connected to the input of said decoder, and means for opening said normally closed gate in response to each pulse at the output of said timing extractor.

21. A hybrid circuit as claimed in claim 20 wherein said encoding and decoding means are a delta-modulation encoder and decoder, respectively.

22. A repeater for use in a PCM transmission system comprising;

(a) first and second input-output terminals for connection to two wire transmission lines, (b) a first reshaping means having its output connected to said second input-output terminal for reshaping pulses received at said first terminal, (c) a second reshaping means having its output connected to said first input-output terminal for reshaping pulses received at said second terminal, and (d) means for controlling anti-coincidence of pulses at the outputs of said first and second reshapers.

23. A repeater as claimed in claim 22 wherein said means for controlling comprises:

(a) timing extractor means responsive to the pulses received at said first terminal for generating first and second clock pulse wave forms having pulse repetition frequencies equal to the base pulse repetition frequency of the incoming code at terminal one and having bit times delayed therefrom by predetermined and different amounts, (b) a first bit memory connected between the first terminal and the input to said first reshaping means for storing input pulses applied thereto, (c) a second bit memory connected between the second terminal and the input to said second reshaping means for storing input pulses applied thereto, (d) means responsive to the clock pulses in said first clock pulse wave form for transferring the contents of said second bit memory to the input of said second reshaping circuit, (e) means responsive to the clock pulses in said second clock pulse wave form for transferring the contents of said first bit memory to the input of said first reshaping circuit, (f) means responsive to the clock pulses in said first clock pulse wave form for blocking pulses appearing at terminal one from being applied to either said first bit memory or the said timing extractor means, and (g) means responsive to the clock pulses in said second clock pulse wave form for blocking pulses appearing at terminal two from being applied to said second bit memory.

References Cited

UNITED STATES PATENTS

| | | | |
|---|---|---|---|
| 2,912,508 | 11/1959 | Hughes | 179—15 |
| 3,083,267 | 3/1963 | Weller | 179—15 |
| 3,112,369 | 11/1963 | Sparrendahl | 179—15 |
| 3,292,178 | 12/1966 | Magnuski | 179—15 |

KATHLEEN H. CLAFFY, Primary Examiner

D. L. STEWART, Assistant Examiner